US006749368B2

United States Patent
Ankeny et al.

(10) Patent No.: US 6,749,368 B2
(45) Date of Patent: Jun. 15, 2004

(54) DESIGN, MONITORING AND CONTROL OF SOIL CARBURETORS FOR DEGRADATION OF VOLATILE COMPOUNDS

(75) Inventors: Mark D. Ankeny, Albuquerque, NM (US); James A. Kelsey, Corrales, NM (US)

(73) Assignee: Daniel B. Stephens & Associates, Inc., Albuquerque, NM (US)

( * ) Notice: Subject to any disclaimer, the term of this patent is extended or adjusted under 35 U.S.C. 154(b) by 0 days.

(21) Appl. No.: 09/946,392

(22) Filed: Sep. 4, 2001

(65) Prior Publication Data

US 2002/0067953 A1 Jun. 6, 2002

Related U.S. Application Data

(60) Provisional application No. 60/230,085, filed on Sep. 5, 2000, and provisional application No. 60/230,356, filed on Sep. 6, 2000.

(51) Int. Cl.[7] ................................................. B09B 5/00
(52) U.S. Cl. ............................. 405/129.5; 405/129.95; 405/129.2
(58) Field of Search ...................... 405/129.1, 129.2, 405/129.25, 129.45, 129.5, 129.55, 129.57, 129.7, 129.85, 129.9, 129.95, 128.1, 128.15, 128.2, 128.25, 128.3

(56) References Cited

U.S. PATENT DOCUMENTS

| | | | | | |
|---|---|---|---|---|---|
| 4,026,355 A | * | 5/1977 | Johnson et al. | ........ | 405/129.95 |
| 4,323,367 A | * | 4/1982 | Ghosh | .................... | 405/129.95 |
| 4,442,901 A | * | 4/1984 | Zison | ........................... | 166/369 |
| 4,464,081 A | * | 8/1984 | Hillier et al. | ............. | 405/129.7 |
| 4,483,641 A | * | 11/1984 | Stoll | ........................ | 405/129.5 |
| 4,518,399 A | * | 5/1985 | Croskell et al. | ........ | 405/129.95 |
| 4,529,497 A | * | 7/1985 | Watson et al. | ........... | 405/128.4 |
| 4,650,367 A | * | 3/1987 | Dietzler | ........................ | 405/43 |
| 4,670,148 A | * | 6/1987 | Schneider | .................... | 210/170 |
| 4,745,850 A | * | 5/1988 | Bastian et al. | ............ | 405/129.1 |
| 4,832,122 A | * | 5/1989 | Corey et al. | ............ | 405/128.25 |
| 4,850,745 A | * | 7/1989 | Hater et al. | ............ | 405/128.45 |
| 5,259,697 A | * | 11/1993 | Allen et al. | ............ | 405/129.45 |
| 5,263,795 A | * | 11/1993 | Corey et al. | ............ | 405/128.25 |
| 5,277,518 A | * | 1/1994 | Billings et al. | .......... | 405/128.3 |
| 5,295,763 A | * | 3/1994 | Stenborg et al. | ......... | 405/129.4 |
| 5,299,140 A | | 3/1994 | Ankeny et al. | | |
| 5,345,034 A | * | 9/1994 | Corey | .................... | 405/129.45 |
| 5,421,672 A | * | 6/1995 | Ankeny et al. | ........ | 405/129.45 |
| 5,449,251 A | * | 9/1995 | Daily et al. | ............ | 405/128.35 |
| 5,564,862 A | * | 10/1996 | Markels, Jr. | ........... | 405/129.95 |
| 5,857,807 A | * | 1/1999 | Longo, Sr. | ............. | 405/129.95 |
| 6,024,513 A | * | 2/2000 | Hudgins et al. | ........ | 405/129.95 |
| 6,139,221 A | | 10/2000 | Ankeny et al. | | |
| 6,334,737 B1 | * | 1/2002 | Lee | ......................... | 405/129.5 |
| 6,467,994 B1 | | 10/2002 | Ankeny et al. | | |

* cited by examiner

Primary Examiner—Frederick L. Lagman
(74) Attorney, Agent, or Firm—McKee, Voorhees & Sease, P.L.C.

(57) ABSTRACT

An apparatus and method for controlling and/or monitoring volatile compounds such as those buried underground. A cover or cover layer is placed over the source of the volatile compounds in the ground. The cover is intentionally made to be relatively gas permeable, to allow movement of volatile compounds upward into the cover. Oxygen is encouraged to be mixed with the volatile compounds in the layer to promote oxidation and degradation of the volatiles. The treated volatile compounds can then be allowed to be emitted from the cover into atmosphere. According to an aspect of the apparatus and method, optionally, a conduit can be placed in the cover to carry and eject oxygen to and into the cover layer. It can also be used to gather in a mixture of volatiles and air (with oxygen) and transport the mixture to a desired location. Still further, another aspect of the invention includes measuring and monitoring the presence and/or amount of a volatile compound in the ground. The measurement can be used for a variety of purposes, including optimizing the control of volatile compounds.

47 Claims, 3 Drawing Sheets

DESIGN, MONITORING AND CONTROL OF SOIL CARBURETORS FOR DEGRADATION OF VOLATILE COMPOUNDS

This application claims benefit of Provisional Application Serial No. 60/230,085 filed Sep. 5, 2000, and claims benefit of No. 60/230,356, filed Sep. 6, 2000.

I. BACKGROUND OF THE INVENTION

A. Field of the Invention

The present invention relates to monitoring and control of volatile organic compounds in soil, and in particular, to apparatus, methods and systems for the same.

B. Problems in the Art

Municipal landfills contain large quantities of organic refuse that slowly decompose, yielding biogenic landfill gas (EMCON, 1980). Landfill gas (or LFG) is generated primarily by methanogenic bacteria through the anaerobic decomposition of organic matter and consists of approximately 50% methane and 50% carbon dioxide, with the proportions depending on the composition of the organic matter in the landfill. Landfill gas production usually declines in an exponential manner from the time of initial refuse emplacement, with a "half life" on the order of 10 years or so, though this can vary considerably depending on the site-specific moisture content and subsurface temperature (Barlaz et al., 1990).

Landfill gas emissions cause several problems. Emissions often result in failure to meet regulatory air quality standards. Many landfills that were closed 20 or more years ago are still generating large quantities of landfill gas. Landfill gas often contains appreciable concentrations of hazardous volatile organic compounds (VOCs) (CARB, 1990, Allen et al., 1997).

Landfill gas is also a major source of methane. Methane is a potent greenhouse gas. Therefore, there has been a recent increase in legislative, regulatory, and technical interest in methods to control methane emissions from landfills. A consequence of this interest is the need to measure landfill gas surface concentrations and fluxes through surfaces such as landfill covers. Global warming has raised concern about methane fluxes from landfills and no cost-effective method currently exists to monitor surface fluxes and standard cover surface monitoring does not distinguish between methane and NMOC emissions. Long-path Fourier transform infrared (FTIR) and micrometeorological data do give good estimates, but are generally not economically practical.

Many gases of concern are also toxic to plant roots and landfill covers often have dead zones where plants have been killed by gas emissions. Plant-free dead zones suffer more erosion and leads to more maintenance costs. Where there are no plants, there is no transpiration. Without transpiration, more water percolates through the waste and results in higher leachate production. More leachate results in increased leachate treatment and disposal costs and increases the potential for liquid release to the environment.

The standard approach to degradation of landfill gas involves expensive drilling in waste, a manifold system to carry gas around a site, a flare (and occasionally a generator), and a method of dealing with condensate (water vapor that has condensed in the plumbing system). Implementation of this standard engineering design generally costs a million dollars or more per site. Maintenance of the design requires periodic drilling and connection of new gas extraction wells and expensive maintenance of the plumbing and flare system. Flares often produce and release dioxins to the atmosphere, which microbes do not do.

Methane and NMOC emissions can be rendered substantially inert and environmentally harmless by oxidation (e.g. $2O_2+CH_4$ or $NMOC \rightarrow CO_2+H_2O$). Soil microbes obey the same laws of thermodynamics as do flares and generally have lower operation and maintenance (O&M) costs. If the soil cover immediately above the waste can effectively oxidize methane and degrade NMOCs, both a less expensive alternative cover and exemption from aspects of gas monitoring requirements could be justified. Using microbes to treat LFG calls on the same type of natural degradation processes used for many environmental restoration purposes.

Optionally, it may be beneficial to have an economical way to measure the concentration of volatile compounds in the ground. Such measurements could be used to check on effectiveness of control of the compounds. They could also be used for other purposes.

It is therefore a principal object, feature or advantage of the present invention to provide an apparatus and method which solves the problems and deficiencies in the art.

Other objects, features, or advantages of the present invention are to provide an apparatus and method:

a. for controlling volatile organic compounds in soil.
b. which is economical.
c. which is durable, reliable, and efficient.
d. which is less complex than existing technologies.
e. which has less construction, operating, and maintenance cost.
f. which deters release of environmentally hazardous or dangerous substances, such as through emissions or leakage.

An optional object, feature, or advantage of the present invention is an apparatus and method for monitoring and/or measuring concentrations of volatile organic compounds in soil:

a. which is cost effective and has reasonable accuracy.
b. which is economical.
c. which can be used to measure effectiveness or assist in control of the volatile compounds.
d. Which can be used in conjunction with apparatus and methods to control volatile organic compounds in soil.

Another optional object, feature or advantage is an apparatus and method to:

a. encourage and support plant growth and transpiration.
b. deter erosion or leaching.
c. Function with control and/or monitoring of volatile compounds in soil.

What will be called the "soil carburetor" design of the present invention can use economical materials, such as waste stream materials, to build a subsurface permeability structure suitable for injection, mixing, and oxidation of volatile organic carbons or methane. Use of this design results in reduced cover construction expenses and the elimination of expensive gas flaring systems. Advantageous use of microbes in the soil can encourage and sustain oxidation.

These and other objects, features, and advantages of the present invention will become more apparent with reference to the accompanying specification and claims.

II. SUMMARY OF THE INVENTION

The present invention relates to an apparatus, method, and system for controlling volatile organic compounds buried or otherwise in the ground. The apparatus includes a relatively air permeable cover, including soil, placed over a location in the ground containing volatile organic compounds. One example is a landfill which is generating landfill gas. Microbes in the soil are essentially catalysts to oxidize at least some of the gaseous volatile organic compounds as they move into the air permeable portion of the cover, which, like a carburetor, facilitates mixing of the compounds and oxygen from air, and the break down or oxidization of them, to convert them to a less troublesome form.

The method includes mixing air with the volatile compounds in the ground to encourage oxidation or other beneficial transformations.

In one aspect of the invention, this soil carburetor injects and mixes gases for "combustion" in the sense described herein. The soil carburetor is a porous gas-permeable system consisting of layers of soil, active subsurface material (e.g. landfill waste), and other materials designed to mix and oxidize or degrade volatiles emanating from subsurface sources such as landfills. Within this layered system, pipes can be added for monitoring, injection, and extraction.

Air is mixed with the gaseous volatile compounds in the high-air-permeability subsurface layer. Microbes in the soil cover oxidize methane and degrade other gases that may be present in the gas stream.

In another aspect of the invention, gas samples can be pulled from monitoring pipes for tomographic quantification and optimization of system performance. The tomographic soil gas monitoring techniques can be used independently of the soil carburetor treatment system.

III. BRIEF DESCRIPTION OF THE DRAWINGS

IV. DETAILED DESCRIPTION OF PREFERRED EMBODIMENTS

A. Overview

Figure 1:
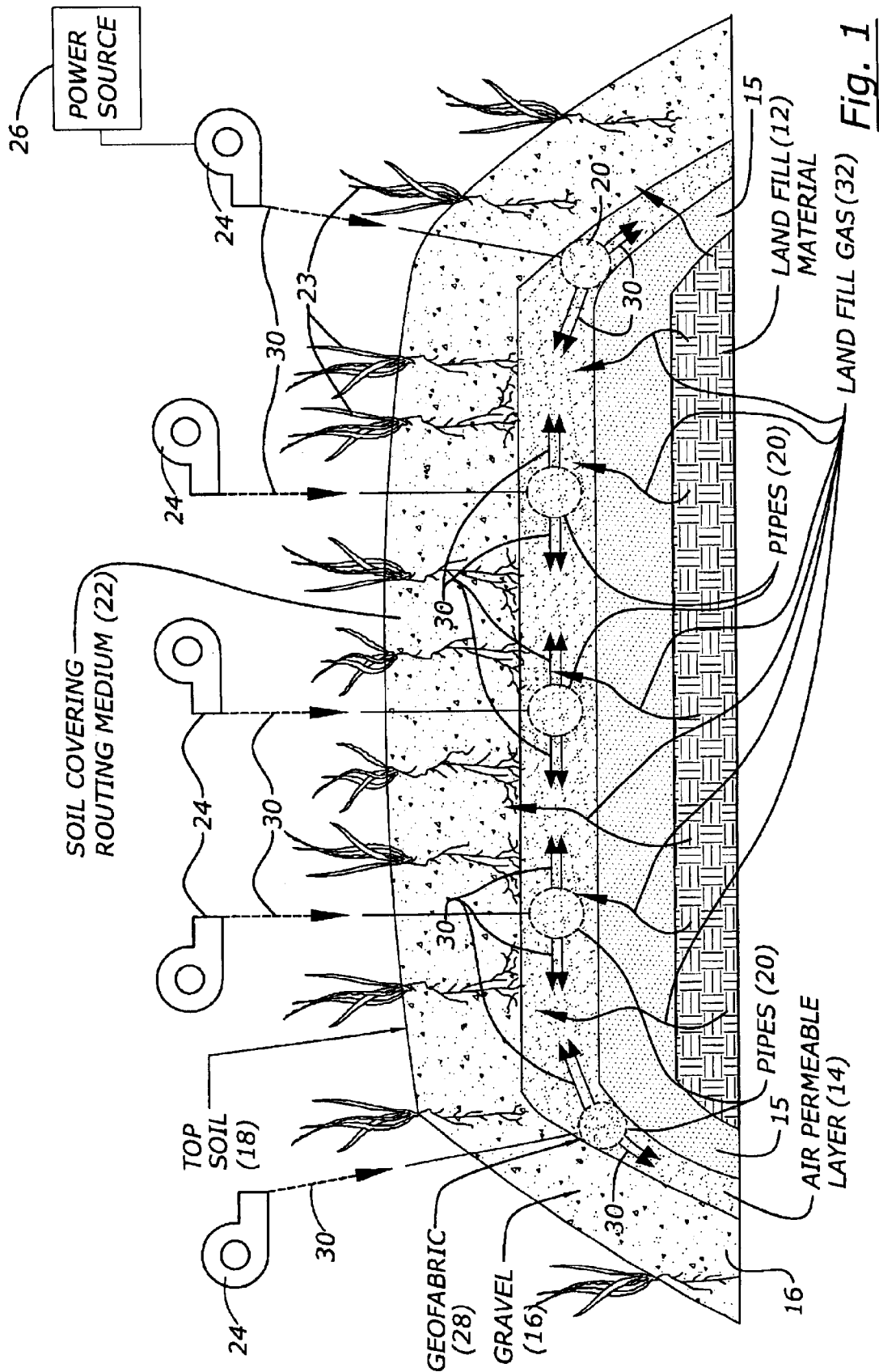
FIG. 1 is a diagrammatic elevation section illustrating an embodiment of an apparatus to control volatile compounds according to the present invention, as installed in the ground.
Figure 2:
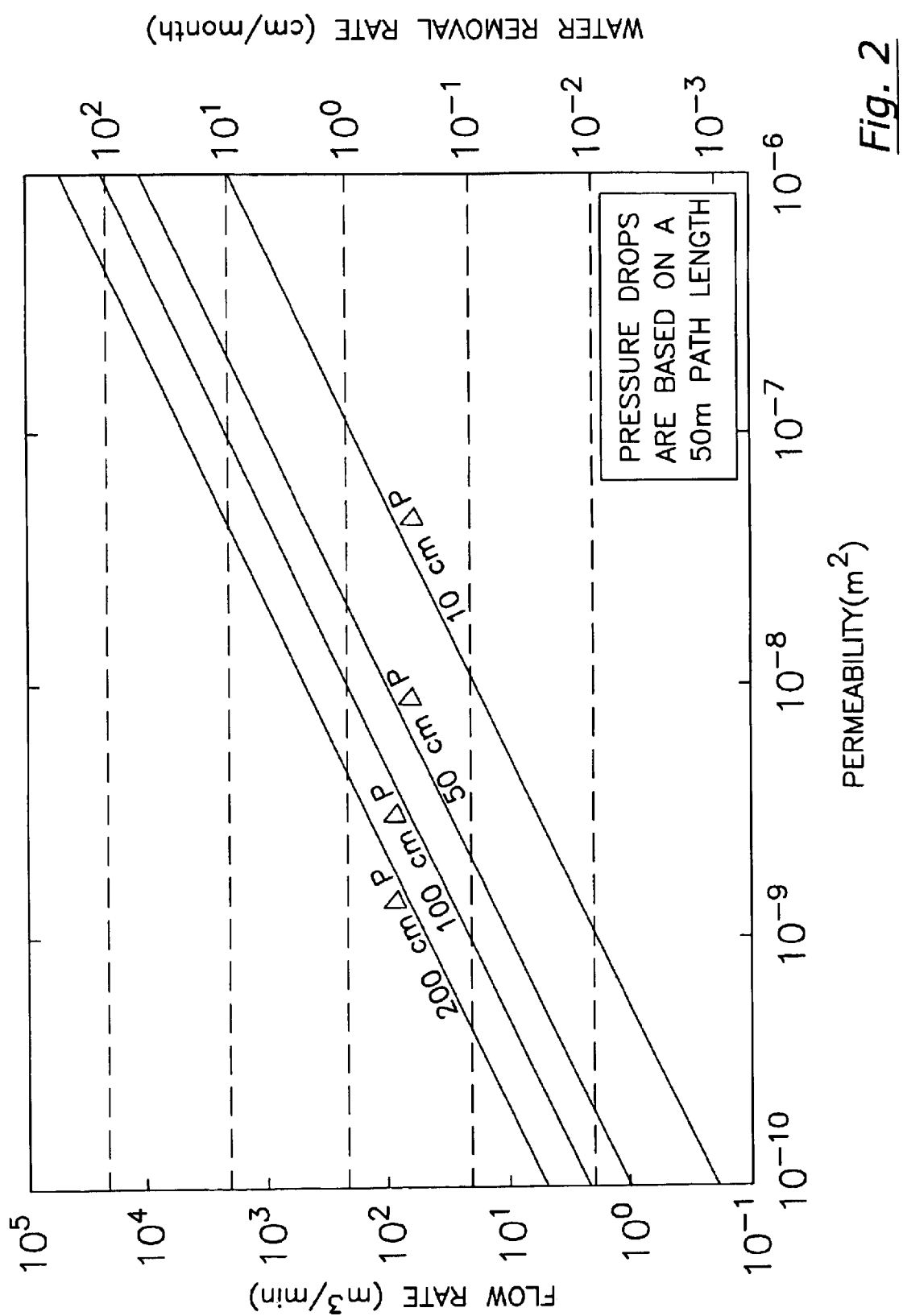
FIG. 2 is a nomograph of the type that could be used in designing the apparatus according to the invention.

Preferred embodiments of the invention will now be described in detail to assist in attaining a better understanding of the invention. It is to be understood that these embodiments are but exemplary forms the invention can take.

Reference will frequently be taken to the appended drawings where reference numerals are used to indicate certain parts and locations. The same parts and locations will be indicated by the same reference numbers throughout the drawings, unless otherwise indicated.

B. General Environment

The present embodiment will be discussed in the context of an apparatus and system for landfill gas (LFG) emissions treatment. It is to be understood, however, that the invention is applicable in other environments and for other purposes.

C. General Structure and Operation of An Embodiment

Figure 3:
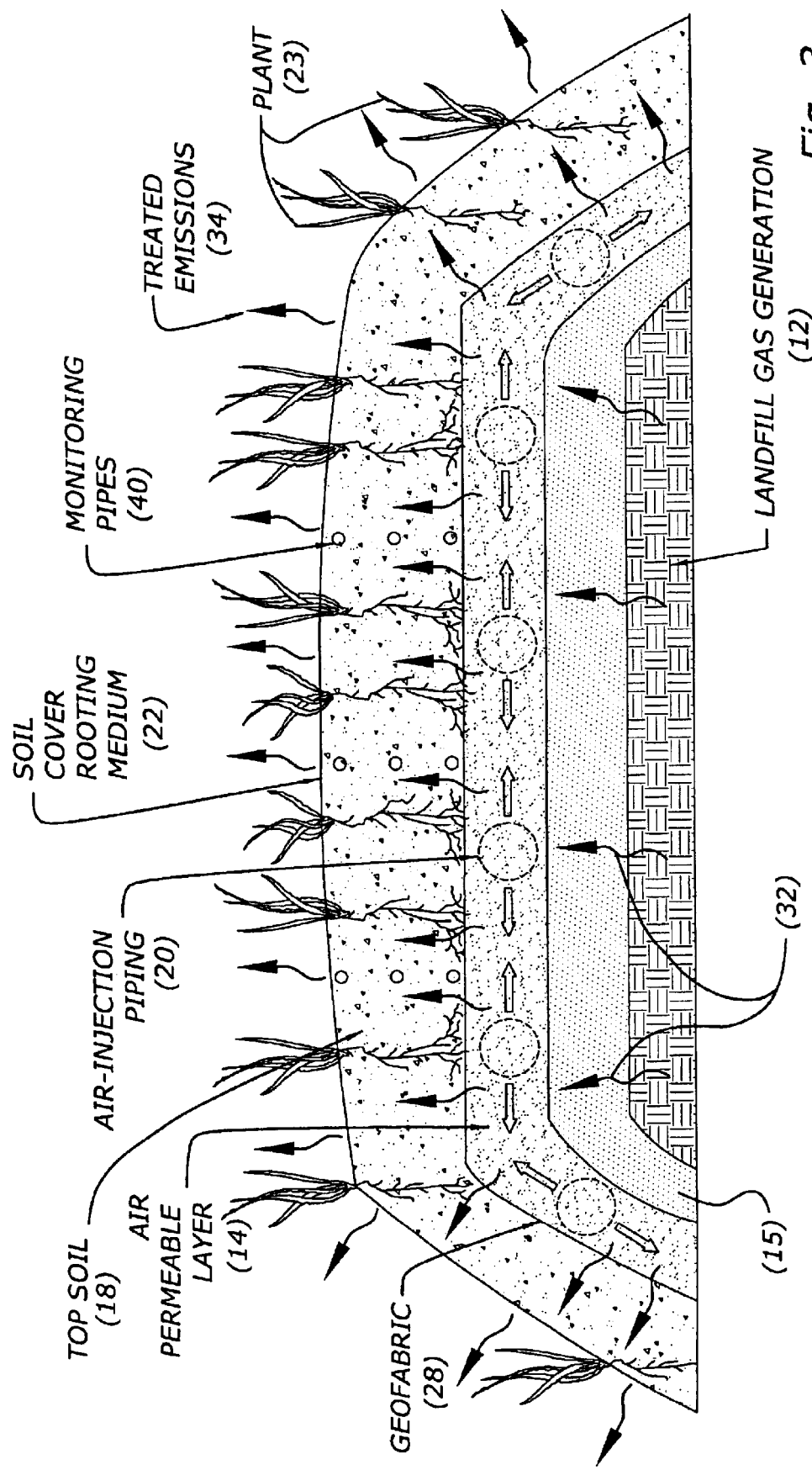
FIG. 3 is similar to FIG. 1, but further including an apparatus for measuring and monitoring volatile compounds in the ground.

A preferred design is to emplace construction and demolition (C&D) waste and/or other high air permeability waste over a relatively larger-diameter inexpensive embedded perforated pipe system and a relatively smaller perforated pipe monitoring system (see. e.g., FIG. 3). Another one or two meters of high-permeability fill material is then placed over the pipes and the fill is then covered with an inexpensive soil cover. This design uses a distributed air injection manifold. Embedded cross-linked pipe in a grid configuration is pressurized with small blowers around the system. The injected air mixes with methane emanating from the waste. Methane oxidation then occurs in the C&D waste and in the cover soil.

A soil carburetor can be built with or without a high-air-permeability layer underlying the soil cover layer. An example of a high air permeability layer is a layer of C&D waste and/or other high-air-permeability waste. It is placed over an inexpensive, embedded, perforated pipe system. An inexpensive alternative soil cover approximately one meter thick is then emplaced over this high-permeability waste. The second design omits the high-air-permeability layer in favor of a perforated pipe network with closely spaced pipe to provide aeration of the soil.

Another design is shown in FIG. 1, where a cover layer is placed over an higher air permeability layer which includes a network of air injection pipes.

In the designs using a distributed air injection manifold 20, it replaces a more capital- and O&M-intensive centralized LFG extraction system in the state of the art. The embedded pipe 20 is emplaced in a grid configuration and can be pressurized with, for example, small blowers 26 around the system. The injected air (see reference number 30 of FIG. 1) mixes with methane and NMOCs 30 emanating from the waste. Methane oxidation and NMOC biodegradation then occurs in the C&D waste and in the cover soil.

Soil carburetor pipe 20 spacing and air-flow requirements are relatively simple. Specific design features for individual covers may include elements such as pH buffering with agricultural lime to stabilize the microbial environment, adding activated sludge or other local source of organic material with a diverse microbial culture to assure methane oxidation and NMOC degradation starts rapidly. Others are possible. One or more blowers may be used to inject air through a piping network. Inexpensive plumbing can allow redundancy to provide an overlapping network to ensure adequate air injection rates for system control.

To test the effectiveness of the soil carburetor, air pressure and injection rates can be monitored and controlled with a datalogger and appropriate sensors. For wiring and plumbing simplicity, the gas monitoring and air injection systems are separate, but could be combined. A programmable logic controller can be used to collect the gas monitoring data, process it, and make dynamic decisions to optimize methane oxidation and NMOC degradation.

FIG. 1 illustrates diagrammatically what will be called generally a soil carburetor 10 installed in a landfill. Soil carburetor 10 is an alternative cover to normal landfill covers, which provides treatment and emissions control for both methane and non-methane organic compounds (NMOCs), by enhancing naturally occurring degradation processes within a final solid cover.

FIG. 1 shows a vertical cross section of such a soil carburetor design. In the exemplary embodiment of FIG. 1, soil carburetor 10 comprises layers of gravel 16 and/or soil 18 (gravel is optional) over relatively high permeability material 14 over intermediate soil cover 15, landfill waste 12, and other materials to mix and oxidize or degrade volatile compounds in LFG. Within the layered cover system, pipes 20 or other collectors or distributors, are added for monitoring, injection, and/or extraction. A standardlysized geofabric 28 could be used to deter movement of smaller particles of layer 16 and/or 18 into the larger particles and pieces of layer 14.

Soil carburetor 10, like an internal combustion engine carburetor, injects and mixes gases, but here, the purpose is degradation instead of combustion. As shown in FIG. 1, soil carburetor 10 includes the emplacement of several (1 to 2) meters of construction and demolition (C&D) waste and/or other high-air-permeability waste 14 over an inexpensive embedded perforated pipe system 20 and then places an inexpensive alternative cover (e.g. gravel and/or top soil 16 and/or 18) over this high-permeability waste 14. Top soil 18 can include or comprise a soil covering rooting medium 22 which can support plants 23 such as grass, bushes, etc.

The embedded pipe 20 is cross-linked in a grid configuration and pressurized with small blowers 24, powered by power source 26 (e.g. electrical power) around system 10.

Injected air, via pipe system 20, mixes with LFG methane (illustrated by arrows 30 emanating from the waste 12). Because the carburetor cover allows air 30 (and thus oxygen) into layer 14, air is mixed with LFG in the high-air-permeability subsurface layer 14. Microbes in the soil cover oxidize methane and degrade other gases that may be present in the LFG stream. The methane oxidation occurs in both the C&D waste 15 and in the cover soil 18. Oxidation of methane results in transformation of the troublesome methane into $CO_2$ and water ($H_2O$), which either diffuse out of the cover into the atmosphere (see, e.g., treated emissions 34 of FIG. 3) or are otherwise handled (e.g. transpiration of water by plants).

A variety of design alternatives may be used to take advantage of high-permeability materials that may be available at a landfill. One alternative is to use materials such as native sandy soil, construction and demolition (C&D) debris, shredded green waste (yard/lawn clippings), and/or other high-air-permeability waste.

D. Specific Examples and Considerations

When creating a soil carburetor according the invention, it has been found that various factors many times should at least be considered when designing the system. Following are some examples.

Certain characteristics can make a site a favorable location. One is soil make-up. Sandy soils available on-site will provide good air-permeability. It would also be beneficial if the soils have low plasticity and are unlikely to crack and allow venting of gas through cracks.

Soil samples can be taken and tested for the following parameters: (a) air permeability; (b) Proctor density; (c) Atterberg limits; (d) particle-size distribution; (e) saturated hydraulic conductivity; (f) moisture retention characteristic curves.

If is beneficial to have a substantial depth rooting zone for plants in the soil. Roots cannot grow into and effectively extract water from anaerobic soil. If methane is encountered at 2 feet below surface, few roots are likely to be below 2 feet. Thus, the effective rooting zone may be thinner than assumed in previous evaluations of cover infiltration reduction performance. The actual rooting depth may have significant implications for increases in waste moisture content and resulting increases in methane fluxes over time.

Various cover materials can be used, some of which are fairly low-cost. Examples that tend to be commonly and plentifully available are sandy soil, C&D debris, or green waste.

1. EXAMPLE

Air flow rate through the carburetor needs to be designed for each installation. The following discussion of a specific example for a soil carburetor cover system 10 is intended to give some guidance on the types of issues one would evaluate for a specific design.

The following assumptions are made: (a) 100 ft waste depth; (b) methane generation rate constant (k)=0.02/yr; (c) methane generation potential (Lo)=170 m 3/Mg; and (d) landfill gas stream is 50 percent methane and 50 percent carbon dioxide. Expected performance requirements, based on those assumptions, for the three options for soil carburetors set forth below, will need to deliver approximately 180 cubic feet per minute of air per acre.

For the EPA's Landfill Gas Emissions Model (LandGEM), a peak methane generation rate of 17.9 cubic feet per minute per acre was estimated. The air injection flow rate was calculated, based on methane oxidation stoichiometry that requires two parts oxygen for each part methane for complete oxidation and the fact that ambient air contains approximately 20 percent oxygen. The estimated flow rate of 180 cfm per acre of cover can be, for example, supplied by a single, large-capacity blower or a series of blowers connected to the air injection pipes by a configuration of larger diameter gas distribution piping.

Three optional cover designs, all according to the present invention, are described below. These optional cover designs provide various soil thicknesses corresponding to various maximum saturated hydraulic conductivity (Ksat) limits:

a. Standard cover design with 18 inches of soil with a Ksat less than 10–5 cm/sec.

b. Alternative cover design approved under the permit consisting of 30 inches of soil with a Ksat less than 7.2×10–4 cm/sec.

c. Alternative cover design approved under a permit amendment consisting of 42 inches of soil with a Ksat less than 1.5×10–3 cm/sec.

Each cover design includes a 6-inch topsoil layer, which is not compacted and does not have a Ksat requirement. The topsoil is seeded to establish vegetation. The alternative cover design is an evapotranspiration cover, relying on plant uptake of soil moisture to achieve infiltration reduction performance. Similarly, the soil carburetor alternative cover uses vegetation to minimize infiltration and promote microbial activity in the root zone.

The alternative cover using soil with a Ksat of 1.5×10–3 cm/sec appears to be generally compatible with the air-flow permeability needs for the soil carburetor. A somewhat higher Ksat limit may be sometimes needed to provide for sufficient air flow.

Compaction requirements for the currently approved cover design may need to be altered to provide for minimally compacted soil to enhance air permeability and promote root growth.

Regulatory approval may be needed to reduce the compaction requirements. Besides improving air flow in the cover, this change will reduce costs for cover construction compaction and quality assurance testing.

Various air injection pipe configurations have been tested for air-flow rates and air-distribution in the cover soil. The following factors are tested regarding the pipes:

a. Pipe strength to resist crushing using on-site soils.

b. Air flow through various pipe perforations and emitters.

c. Air distribution in soil using inert tracer gas (helium).

d. Air distribution under various injection rates.

e. Pressure and/or vacuum in air-distribution and monitoring pipes to verify uniformity of air delivery or gas sampling.

f. Monitoring instrumentation performance.

These types of factors will allow avoiding a redundant system due to uncertainties and, instead, allows the final design to be optimized.

Option 1—Soil Carburetor

Option 1 is a soil carburetor that will allow for gas mixing and reaction all in the same 42-inch alternative cover. The cover will serve as a media that will allow landfill gas to mix with injected ambient air, oxidize, and biologically degrade. The entire soil carburetor will be composed of a 42-inch (3.5 feet) layer of permeable soil with only minimal compaction (80 to 85 percent of standard Proctor). This soil layer will consist of unprocessed on-site soils. Imbedded within the soil layer will be polypropylene drip irrigation piping used to inject ambient air via evenly spaced emitters. The following specifications are apply to this option:

| Item | Specification |
| --- | --- |
| Air Injection Pipe Material | ¾-inch nominal polypropylene |
| Air Injection Pipe Spacing | 6.6 foot (2 m) parallel line spacing |
| Air Injection Pipe Perforation Size and Density | Drip irrigation emitters will be spaced at 6.6 foot (2 m) increments |
| Monitoring Pipe Material | ¾-inch polypropylene with flow control emitters |
| Monitoring Pipe Spacing | 100 foot (30 m) centers, layer set at approximately 10 inches (25 cm) bgs |
| Additional Monitoring Pipe | Two sets of three lines spaced at 20-inches (50 cm), 30 inches (75 cm), and 40 inches (100 cm) for the entire landfill |

Option 2—Soil Carburetor with C&D Layer

Option 2 involves construction of an enhanced soil carburetor which includes an additional gas mixing layer comprised of C&D waste. This layer will be built with unprocessed construction and demolition material that has been received at the landfill and stockpiled until construction. Imbedded within the C&D layer will be perforated HDPE piping used to inject ambient air into the gas mixing layer. The C&D gas mixing layer will then be overlain by a 42-inch thick soil layer that will allow for further gas mixing and proper methane and NMOC oxidation and biological degradation. A geotextile (8 to 12 oz) will be placed in between the two layers to prevent fines from the infiltrating into the highly permeable C&D gas mixing layer. The following specifications are apply to this option:

| Item | Specification |
| --- | --- |
| Air Injection Pipe Material | 2-inch nominal, SDR 11 perforated HDPE |
| Air Injection Pipe Spacing | 66 foot (20 m) parallel line spacing |
| Air Injection Pipe Perforation Size and Density | ⅛ inch to ¼ inch diameter perforations spaced at 6.6 foot (2 m) increments |
| Gas Mixing Layer Thickness | 3.3 foot (1 m) layer of construction and demolition waste |
| Monitoring Pipe Material | ¾-inch polypropylene with flow control emitters |
| Monitoring Pipe Spacing | 100 foot (30 m) centers, layer set at approximately 10 inches (25 cm) bgs |
| Additional Monitoring Pipe | Two sets of three lines spaced at 20-inches (50 cm), 30 inches (75 cm), and 40 inches (100 cm) for the entire landfill |

Option 3—Soil Carburetor with Green Waste Layer

Option 3 is an alternative enhanced soil carburetor that includes a green waste gas mixing layer. This layer will consist of unprocessed landscaping waste, grass clippings, branches, wood chips, etc. The material will be stockpiled in sufficient quantities until construction commences. Imbedded within the green waste layer will be corrugated HDPE piping used to inject ambient air into the gas mixing layer. The green waste layer will then be overlain by a geotextile (8 to 12 oz) followed by a 42-inch thick soil layer. The following specifications are apply to this option:

| Item | Specification |
| --- | --- |
| Air Injection Pipe Material | 4-inch nominal perforated corrugated HDPE |
| Air Injection Pipe Spacing | 33 foot (10 m) parallel line spacing |
| Air Injection Pipe Perforation Size and Density | ⅛ inch to ¼ inch diameter perforations spaced at 6.6 foot (2 m) increments |
| Gas Mixing Layer Thickness | 3.3 foot (1 m) layer of green waste |
| Monitoring Pipe Material | ¾-inch polypropylene with flow control emitters |
| Monitoring Pipe Spacing | 100 foot (30 m) centers, layer set at approximately 10 inches (25 cm) bgs |
| Additional Monitoring Pipe | Two sets of three lines spaced at 20-inches (50 cm), 30 inches (75 cm), and 40 inches (100 cm) for the entire landfill |

These examples provide guidance as to design and makeup of embodiments according to the invention.

E. Soil Carburetor Monitoring and Control Using Gas-Concentration Tomography

To test the effectiveness of the soil carburetor, air pressure and injection rates can be monitored and controlled with a datalogger and appropriate sensors. For wiring and plumbing simplicity, the gas monitoring and air injection systems are not tied together. A programmable logic controller is used to collect the gas monitoring data, process it, and make dynamic decisions to optimize methane oxidation. An electrical meter is used to monitor energy consumption.

Measurement of landfill gas concentrations and fluxes is a problem in all potential landfill gas control designs. Regulations currently focus on NMOC concentrations, but only indirectly address the LFG emission rate. The proposed tomographical approach here is designed to substitute the inexpensive mathematics possible with today's computers for more expensive manual monitoring and/or multiple sets of expensive instrumentation. The gist of gas control and carburetion comes down to this: where higher concentrations of landfill gas are measured, proportionally more air will be injected. Thus, tomography has two pragmatic objectives: (1) economic optimization of air injection rates and (2) generation of maps of the performance of a given landfill cover. Such maps can be used to maintain and repair landfill covers.

Tomography is a numerical method for reconstructing a multidimensional picture source from a number of measured transects of an object. Measured properties can be optical densities, x-ray densities, seismic data, gas concentrations, or other properties. Tomography's best known applications today are in medical radiology. The objective of using two-dimensional tomography for soil gas monitoring is the reconstruction of the probability distribution in two-dimensional-phase space from a few measurements of gas concentration profiles collected from simple perforated tubing. In tomography, there are more unknowns than equations, so a functional relationship between points is made based upon measured or expected physical relationships. To the extent the desired information for decision making is qualitative, rigorous quantitative evaluation of the data may not even be needed.

For example, it is often more important to know that a 'hotspot' of flammable or toxic gas exists and needs immediate attention rather than to know how concentrations at that problem location may evolve over time. Thus, an inexpensive system that can be continually sampled often provides more useful information than more expensive systems that are less frequently samples.

This sampling approach is concentration-weighted and not flux-weighted. Therefore, monitored with higher advective gas movement would be underrepresented during sampling. Because of the geometry and permeability structure of the soil carburetor design, using tracer gases in the system, a strong relationship between concentration and flux has been demonstrated. The basis of this relationship is the high ratio of horizontal to vertical permeability in the cover design required for effective mixing of gases. For example, in typical landfill cover profiles, the horizontal to vertical permeability ratios are small due to preferential flow through subsidence cracks, root channels, animal burrows, or other perturbations. If gas moves advectively in an environment where high and uniform horizontal permeability dominates, a sample of gas concentration will accurately reflect the gas stream. If gas moves advectively through a vertical soil profile with a crack or animal burrow, most of the flux will be through the burrow and not the soil matrix. An average concentration of flux through a medium with strong preferential and vertical flow will significantly underestimate gas flux. Monitoring under these conditions may be able to detect hotspots, but would provide potentially misleading information for calculation of gas fluxes.

With the existence of a linear gas sampling system that gives an unbiased average concentration along a transect and that can further be related to flux based upon the design criteria discussed above, it is feasible to lay out orthogonal arrays of gas sampling tubes. The data obtained are mathematically identical in structure to that used in tomographic analyses of more standard data sets. Confirmatory point samples of gas concentrations can also be taken.

Use of tomography does not directly change the measured mean concentration and therefore would not change the estimate of a mean flux. However, by effectively lumping point measurements into an average transect concentration, the estimate of the mean using pipe samplers is based on sampling from more locations and represents a reduction in uncertainty in the estimate of the mean.

Gas-concentration tomography has also been performed by Bhattacharyya and Todd (1994, 1997). They used a series of scanning, open-path FTIR spectrometer measurements coupled with computed tomography to create 2-D maps of chemical concentrations in air. Our mathematical approach is essentially identical to that of Bhattacharyya and Todd. While the mathematical and conceptual approach is solid, the FTIR technology has several limitations: (1) open-path FTIR spectrometers and other potential instrumentation to optically sample composition of a path through air are expensive; (2) the equipment is line-of-sight and cannot bend around corners or "see" through obstructions; and (3) the entire path length must be sampled.

Our invention obtains samples from a pipe array to tubing 40 (see FIG. 3) in the cover. Because soil carburetor 10 uses tubing 40 for gas sample collection, various installation geometries are feasible. The sampling array 40 is emplaced during construction with the air injection/control system 20 to directly evaluate soil carburetor performance. This is particularly useful in design optimization, because spacing and performance issues of monitoring and control can be confounded (e.g., operating parameters, weather, water content, changes in gas generation rate, etc.).

Although, the mathematical approach is essentially identical to that of Bhattacharyya and Todd. Our technical approach differs from that above in the following respects: The soil carburetor monitoring network uses inexpensive perforated pipe 40 with small holes spaced at regular intervals (such as drip irrigation pipe) to collect gas samples. If the pressure drop within the manifold 40 is small and the perforations are uniform, a gas sample that represents the average concentration along the length of the tube is obtained. A small pump (not shown) can pump gas out of the tube 40, and the gas concentration is monitored using field instrumentation and laboratory equipment. The tubing 40 can be placed at various depth intervals below the cover surface or on the soil surface for simple surface monitoring. For example, a 10-by-10 array of tubes crossing at a 90-degree angle would be monitored to produce a total of 20 (10+10) average linear gas concentration measurements. The soil carburetor monitoring network will allow LFG flux estimates to be made, based upon ratios of gases in the soil cover gas along with the known rate of air injection. This measurement of the LFG flux through the cover will provide a sound demonstration that LFG components (methane and NMOCs) are actually being degraded, rather than simply diluted.

Quantification of the LFG treatment and control is needed where there are regulatory limits to gas emissions or where there are tax credits to gain from greenhouse gas reductions. A key feature of concurrent use of the proposed cover design and tomographic monitoring system is that the data can also be used to provide operational feedback for optimizing the efficiency of the soil carburetor (e.g. feedback that can be used to adjust rate of air injection).

The following calculations are based upon the fact that air injection rates can be controlled and resulting gas concentrations can then be monitored at different air injection rates for determining the mixing ratio of air and LFG. Changes in relative concentrations of NMOCs, methane, and carbon dioxide can then be used to evaluate gas control performance of the cover.

A dilution factor (d) for dilution of landfill gases by air is approximately $$d = \frac{(CH_{4\,lower} + CO_{2\,lower})}{(CH_{4\,upper} + CO_{2\,upper})} \quad \text{Equation 1}$$

if background atmospheric carbon dioxide and methane levels are ignored. We will also assume that all the original methane lost is converted to gaseous carbon dioxide with no change in carbon dioxide or methane storage. Thus, $$x = \text{loss of } CH_4 = \text{gain of } CO_2 \quad \text{Equation 2}$$

We can relate the measured methane concentrations at the upper monitoring level in the cover 18 to a lower monitoring level in cover 18 as $$CH_{4\,upper} = (CH_{4\,lower} - x)/d \quad \text{Equation 3}$$

and similarly $$CO_{2\,upper} = (CO_{2\,lower} + x)/d \quad \text{Equation 4}$$

At high dilutions and/or low source concentrations, atmospheric carbon dioxide should be accounted for. This requires a correction in the dilution factor to $$d = \frac{(CH_{4\,lower} + CO_{2\,lower})}{\begin{pmatrix} CH_{4\,upper} - (d-1)CH_{4\,atmosphere} + \\ CO_{2\,upper} - (d-1)CO_{2\,atmosphere} \end{pmatrix}} \quad \text{Equation 5}$$

Atmospheric methane concentrations are approximately 2 ppm and atmospheric carbon dioxide concentrations average approximately 360 ppm.

Accurate determination of the dilution factor is an essential component of a demonstration to show that LFG is being controlled and destroyed, not just diluted with injected air. The degree of methane and NMOC destruction will determine whether the performance objectives of the gas collection and control system are being achieved.

Considering the proposed monitoring system on a stand alone basis, there are a number of potential uses: (1) continuous low-cost monitoring where explosions from combustible gases are possible, (2) compliance monitoring to satisfy regulatory requirements, (3) identification of 'hotspots' to reduce cleanup costs, and (4) improved understanding of physical heterogeneity and scaling in field systems.

Where a soil carburetor design is used, the concentration-flux link can be made which allows gas flux estimates to be made. This is useful where there are regulatory limits to gas emissions from a site or where there are tax or economic consequences of surface gas fluxes (e.g., methane or other greenhouse gases). A key feature of concurrent use of the proposed cover design and tomographic monitoring system is that the data can also be used to provide operational feedback for optimizing the efficiency of the soil carburetor.

The monitoring system can be used anywhere where gas concentrations or fluxes are of interest, as discussed above. The integrated carburetor/monitoring design is potentially of most value as an engineered soil system over a gas-generating source such as a landfill.

Monitoring will use gas tomography methods as described above. A small pump will be used to draw gas from the various pipes, and individual gas concentration measurements will be made on gas from each pipe in the network. This data will allow tomographic analysis to interpret the data and determine the spatial distribution of gas across the cover.

The performance monitoring will address two primary objectives:
1. Standard Monitoring—Meet regulatory monitoring requirements to demonstrate LFG treatment and emissions control. Provide an effective monitoring program to demonstrate soil carburetor operation and performance.
2. Research Monitoring—Investigate in detail the soil carburetor processes of:
    gas and air flow, cover temperature profile, soil moisture profile, and conditions to support vegetation.

The present invention therefore includes a new method to determine the LFG flux rate and monitor emissions. Soil gas in the cover can be analyzed for methane, carbon dioxide, and oxygen concentrations using field instruments (Landtech GA90, Gem500, or Gem 2000). These measurements from various depths in the cover can show the degree of dilution within the cover soil. Knowing the air dilution from both injected air and atmospheric pumping is a key performance monitoring element. This will then allow a determination of the actual combustion or degradation of methane. The combustion and loss of methane in the system will exceed the air dilution factor, thereby demonstrating the system performance.

Likewise, NMOC monitoring can be conducted to demonstrate the combustion and degradation of these compounds. It can show that the NMOC destruction performance meets the regulatory criteria for gas control by conventional LFG collection systems for 98 percent destruction efficiency and release of no more than 20 ppm NMOCs. NMOC samples are collected in summa canisters and submitted to a laboratory for analysis by method 25C.

Monitoring of the temperature profile within the soil carburetor shows evidence of the biological activity and chemical oxidation processes, which cause destruction of NMOCs and methane. Cover temperature profiles are monitored using thermocouples installed in the soil and a dedicated data logger to record continuous temperature measurements. Two sets of approximately eight thermocouples are installed in boreholes at depth intervals extending through the cover. The temperature data is used to understand variable air-flow rates on biological and oxidation process and seasonal variability.

Monitoring of the soil moisture profile within the soil carburetor shows whether moisture conditions are adequate to support plant growth and microbial activity. Soil moisture monitoring will also demonstrate the performance of the cover to minimize moisture infiltration into the landfill. Four sets of approximately four heat dissipation probes (HDPs) will be installed in boreholes at depth intervals extending through the soil cover portion of the cover. The HDPs measure soil moisture tension, which is related to moisture content by calibration for the on-site soils. The HDPs will be located near the thermocouple installations, so two dataloggers will be capable of recording all of the soil moisture and temperature data.

F. Objects, Features, or Advantages of the Invention

It can therefore be seen how the exemplary embodiments achieve at least all of the objects, features, or advantages of the invention. Examples are as follows.

The soil carburetor alternative cover provides treatment and emissions control for both methane and non-methane organic compounds (NMOCs) by enhancing naturally occurring degradation processes within a final soil cover.

The gas tomography monitoring design allows the efficient operation and evaluation of a soil carburetor. In addition, the monitoring system used by itself is an inexpensive means to locate hotspots of toxic or flammable gases. Global warming has raised concern about methane fluxes from landfills and no cost-effective method currently exists to monitor surface fluxes. Long-path Fourier transform infrared (FTIR) and micrometeorological data do give good estimates, but are not economically practical.

The soil carburetor is intended to provide a low-cost solution to LFG treatment and emission control requirements. The technology is not a replacement for conventional LFG collection and gas-to-energy systems where these projects are viable. The soil carburetor is well suited to arid and semi-arid landfills where alternative soil covers provide equivalent infiltration reduction performance and pass regulatory approval. At many landfills, the soil carburetor can provide LFG treatment to meet the requirements of the New Source Performance Standards (NSPS) and Emission Guidelines (EG).

The soil carburetor design can use waste stream materials to build a low-cost, subsurface permeability system suitable for injection, mixing, and destruction of LFG. Use of this design can result in reduced cover construction expenses and the elimination of expensive gas collection systems and their operation.

The soil carburetor alternative cover design provides a system for collection and treatment of LFG. The cover also combines LFG treatment advantages with the advantages of an alternative evapotranspiration cover for infiltration reduction performance. The soil carburetor and evapotranspiration cover designs are complimentary. Both use relatively permeable soils and promote vegetative growth. Both the soil carburetor and evapotranspiration cover gain their performance advantage by harnessing natural processes of plant growth and microbial degradation.

The soil carburetor monitoring system provides a superior method for monitoring of LFG emissions quality and flux. Standard surface monitoring for LFG emissions has significant uncertainties related to wind and weather conditions and tells nothing about the flux rate of emissions. The gas tomography monitoring design allows the efficient operation and evaluation of a soil carburetor. In addition, the monitoring system used by itself is an inexpensive means to locate LFG hot spots.

Some savings are achieved with the soil carburetor design, because the usual expense for soil compaction is eliminated. This in part helps to off-set the additional costs for the soil cover.

The preliminary cost estimates need considerable refinement as the soil carburetor design is completed and regulatory requirements are determined. Costs will depend upon the scale of the soil carburetor cover, with efficiencies gained on a unit-acre basis for a larger project. The preliminary cost estimates provide reasonable comparisons between alternatives, and show that the soil carburetor may provide construction cost savings. We believe that the soil carburetor can also provide substantial long-term O&M cost savings as compared to conventional LFG collection systems.

It is believed that the soil carburetor will produce equivalent, if not better, control of NMOCs from a regulatory (e.g. air quality gas collection) and scientific standpoint.

G. Options and Alternatives

The included preferred embodiment is given by way of example only and not by way of limitation to the invention which is solely described by the claims therein. Variations obvious to one skilled in the art will be included within the invention defined by the claims.

A variety of design alternatives may be used to take advantage of high-permeability materials that may be available at a landfill. One alternative is to use materials such as native sandy soil, construction and demolition (C&D) debris, shredded green waste, and/or other high-air-permeability waste. The permeable material is emplaced over a network of perforated, relatively large-diameter pipe to inject and uniformly distribute air into the overlying soil cover. A second design alternative is to use smaller pipe at closer spacings in a monolayer soil cover for air injection. Monitoring of either of these design alternatives will use a second network of small-diameter perforated pipe installed at multiple levels in the soil cover to draw soil gas samples for performance monitoring.

A cost analysis, where the capital and O&M costs for the soil carburetor covers are compared to costs for a typical LFG collection and flare system, shows that the soil carburetor has the potential to provide significant cost savings. Careful consideration has been given to the constructability of the soil carburetor covers, and design features that provide effective cover aeration and monitoring capabilities.

Construction methods should be planned that minimize the complexity that the soil carburetor piping network adds to typical cover construction. Construction methods will need to be compatible with pipe selection to provide for low-cost materials that will also stand up to installation stresses and long-term operation.

Specifications for all construction materials can include some or all of the following depending upon the selected design:

Common fill;
Topsoil;
Seeding;
Soil amendment (biosolids);
Filter fabric;
C&D or green waste components;
Solid and perforated piping (HDPE);
Small diameter tubing (polypropylene);
Positive pressure air blower(s);
Positive displacement pump(s) for monitoring;
Equipment enclosures;
Monitoring instrumentation;
Barometric pressure station.

Special construction methods may be needed for piping system installation. The piping network may require non-standard perforations or a filter fabric wrap around the pipe.

One potential option is to use pipes 20 to either inject or extract. Injection of air has been previously described. Injection of other things is possible. Further, extraction, e.g. by vacuum or suction, could also occur. A specific example could be use of suction in pipes 20 near the border of the cover to suck in gas that tends to escape out the sides of the cover, and transport such gas towards the middle of the landfill, where it can then be re-injected into the permeable layer 14 for oxidation or degradation.

H. References

Ball B. C., Dobbie K. E., Parker J. P., Smith K. A. 1997. The influence of gas transport and porosity on methane oxidation in soils. Journal of Geophysical Research-Atmospheres, 102(#D19):23301–23308.

Bhattacharyya, R. and L. A. Todd. 1994. Optical Sensing for Environmental and Process Monitoring. Proc. SPIE Vol. 2365, p. 170–176, Orman A. Simpson; Ed.

R. Bhattacharyya and L. A. Todd. 1997. Spatial and Temporal Visualization of Gases and Vapors in Air Using Computed Tomography: Numerical Studies. Annals of Occupational Hygiene. 41: 105–122.

Boeckx P., and van Cleemput O. Methane Oxidation in a Neutral Landfill Cover Soil: Influence of Moisture Content, Temperature, and Nitrogen-Turnover. 1996. Journal of Environmental Quality, 25:178–183.

Boeckx, P., van Cleemput, O., and Villaralvo, I. 1996. Methane Emission from a Landfill and the Methane Oxidizing Capacity of its Covering Soil. Soil Biology, 28:1397–1405.

Borjesson, G., Sundh, I., Tunlid A., Frostegard A., and Svensson B. H. Microbial oxidation of $CH_4$ at high partial pressures in an organic landfill cover soil under different moisture regimes FEMS Microbiology Ecology, 26:207–217.

Chu K. H., Alvarez Cohen L., I. 2000. Treatment of Chlorinated Solvents by Nitrogen-fixing and Nitrate-supplied Methane Oxidizers in Columns Packed with Unsaturated Porous Media. Environmental Science & Technology, 34:1784–1793.

DeVisscher, A, Thomas, D., Boeckx, P., and Van Cleemput, O. 1999. Methane oxidation in simulated landfill cover soil environments. Environmental Science & Technology, 33:1854–1859.

Goulding K. W. T, Willison T. W., Webster C. P., Powlson D. S. 1996. Methane Fluxes in Aerobic Soils. Environmental Monitoring and Assessment, 42:175–187.

Hilger H. A., Wollum A. G., and Barlaz M. A. 2000. Landfill Methane Oxidation Response to Vegetation, Fertilization, and Liming. Journal of Environmental Quality, 29: 324–334.

Tlustos P., Willison T. W., Baker J. C., Murphy D. V., Pavlikova D., Goulding K. W. T., and Powlson D. S. Short-term Effects of Nitrogen on Methane Oxidation in Soils. 1998. Biology and Fertility of Soils, 28:64–70.

Ball, B. C., K. E. Dobbie, J. P. Parker, and K. A. Smith. 1997. The influence of gas transport and porosity on methane oxidation in soils. *Journal of Geophysical Research-Atmospheres*, 102(#D19):23301–23308.

What is claimed is:

1. An apparatus for controlling a volatile compound in an underground area comprising:
   (a) a cover positioned generally over said underground area, the cover being relatively gas permeable;
   (b) an air injection conduit in or to the cover adapted to inject air into the cover and make the air available to mix with said volatile compound that enters the cover to encourage oxidation or degradation of the volatile compound in the cover.

2. The apparatus of claim 1 wherein the cover comprises a layer of soil.

3. The apparatus of claim 2 wherein the layer of soil is substantially gas permeable.

4. The apparatus of claim 3 wherein the layer of soil is substantially gas permeable to said volatile compound and to air from the atmosphere.

5. The apparatus of claim 1 further comprising a conduit placed in the cover, the conduit having gas permeable openings.

6. The apparatus of claim 5 wherein the conduit is in fluid communication with a source of oxygen.

7. The apparatus of claim 6 wherein the source of oxygen is atmospheric air.

8. The apparatus of claim 5 wherein the conduit is a pipe.

9. The apparatus of claim 8 wherein the pipe is made from relatively inexpensive material.

10. The apparatus of claim 1 wherein the cover comprises a layer of relatively high gas permeability.

11. The apparatus of claim 1 wherein the volatile compounds are created by land fill waste.

12. The apparatus of claim 1 wherein the cover comprises a layer of relatively high gas permeability above the underground area, a layer of gas permeable soil over the layer of relatively high gas permeability.

13. The apparatus of claim 12 further comprising a soil covering rooting medium over or in the layer of gas permeable soil.

14. The apparatus of claim 13 further comprising a plant growing in the soil covering rooting medium.

15. The apparatus of claim 5 further comprising a device in operative communication with the conduit adapted to provide oxygen under pressure to the conduit.

16. The apparatus of claim 15 wherein the device is a blower.

17. The apparatus of claim 5 wherein the conduit further comprises a network of conduits distributed through at least a portion of the underground area.

18. The apparatus of claim 17 wherein the network of conduits are distributed generally horizontally.

19. The apparatus of claim 17 wherein the conduits are adapted to inject and extract gas from the at least a part of the cover.

20. The apparatus of claim 15 further comprising a controller operatively connected to the device, the controller capable of adjusting the amount of oxygen under pressure created.

21. The apparatus of claim 1 further comprising the cover adapted to allow gases to percolate therethrough into atmosphere.

22. The apparatus of claim 1 further comprising catalysts in the cover to encourage oxidation or degradation of the volatile compound.

23. The apparatus of claim 1 further comprising a source of suction or vacuum connected the conduit for extraction of substance from the cover.

24. The apparatus of claim 1 further comprising a source of pressure and a source of suction or vacuum connected to the conduit for extraction of gas or inject of gas into the cover.

25. The apparatus of claim 1 further comprising a control system to control the air pressure in the conduit.

26. A method of treating underground volatile compounds comprising:
   (a) covering the underground compound with a material that is generally gas permeable;
   (b) encouraging, within the cover, oxidation or degradation of volatile compound that enters the cover by injecting air into the cover to mix with said volatile compound that enter the cover.

27. The method of claim 26 wherein the material is soil.

28. The method of claim 26 wherein the material is highly gas permeable.

29. The method of claim 28 wherein the material is selected from the set comprising gravel, construction and demolition waste, green waste.

30. The method of claim 26 further comprising establishing plant growth on top of the cover.

31. The method of claim 30 further comprising establishing root growth in the cover to encourage transpiration.

32. The method of claim 26 further comprising adding oxygen to the cover.

33. The method of claim 33 wherein the step of adding oxygen to the cover comprises directing pressurized atmospherical air to the cover.

34. The method of claim 33 wherein the step of adding oxygen comprising distributing oxygen throughout a cross-sectional area of the underground area.

35. The method of claim 26 further comprising measuring the presence of a volatile compound.

36. The method of claim 35 wherein the step of measuring comprises using tomography.

37. The method of claim 36 wherein the step of measuring comprises gathering a sample of the volatile compound from the cover.

38. The method of claim 37 wherein the step of gathering comprises obtaining a sample of volatile compound across a distance such that the sample is representative of original concentration of the volatile compound.

39. The method of claim 38 further comprising applying laboratory techniques to the sample to obtain an estimate of mean flux of the volatile compound.

40. The method of claim 38 wherein the step of gathering comprises extracting a sample from a gas permeable conduit placed in or above the cover.

41. An apparatus for treating volatile compounds in an underground area comprising:
   (a) a cover over the underground area, the cover being gas permeable;
   (b) a plurality of gas permeable pipes distributed across a generally horizontal cross-section of the cover, the pipes being in fluid communication with one another at a connection, the connection adapted for fluid communication with a source of oxygen;
   so that oxygen can be mixed with volatile compounds entering the cover from the underground area.

42. The apparatus of claim 41 wherein the connection is adapted for connection to a source of pressurized gas.

43. The apparatus of claim 41 wherein the connection is adapted for connection to a vacuum source.

44. The apparatus of claim 41 further comprising a second plurality of gas permeable pipes distributed across or above a generally horizontal cross-section of the cover, the second plurality of gas permeable pipes being in fluid communication with an extraction connection.

45. The apparatus of claim 44 wherein the extraction connection is adapted for connection to a source of vacuum to convey a sample of gas from the second plurality of pipes to an analysis device.

46. An apparatus for monitoring the presence of volatile compounds in an underground area comprising:
   (a) a sampling array for collection of a sample of gas positioned in a gas permeable layer above and covering the underground area;
   (b) a conduit between the sampling array and a connection to an analysis device adapted to analyze the gas sample taken from the sampling array for concentration of a volatile compound;
   so that volatile compounds in the underground area can be monitored by collecting gas samples that enter the gas permeable layer.

47. A method of measuring the presence of a volatile compound in an underground area comprising:
   (a) obtaining a sample of gas from above the underground area, the sample being representative of the original concentration of gases from the underground area;
   (b) correlating the location of a particular concentration of gases to a location within the underground area;
   (b) deriving an estimate of mean flux of concentration of a volatile component from the sample.

* * * * *